Patented Jan. 7, 1947

2,413,720

UNITED STATES PATENT OFFICE 2,413,720

SYNTHESIS OF TERPENE COMPOUNDS

Donald A. Lister, Brunswick, Ga., assignor to Hercules Powder Company, Wilmington, Del., a corporation of Delaware No Drawing. Original application May 23, 1941, Serial No. 394,860. Divided and this application November 2, 1945, Serial No. 626,443

11 Claims. (Cl. 260—631.5)

This invention relates to a method for the production of polyhydroxy products from terpene hydrocarbons and to the products obtained. More particularly, it relates to a method for the preparation of polyhydroxy, including freely water-soluble, terpene products by reaction of terpene hydrocarbons with water and oxygen.

It has been found that certain unsaturated terpene hydrocarbons react to form freely water-soluble products upon simultaneous reaction with water and free oxygen. In accordance with this invention, an unsaturated monocyclic terpene hydrocarbon in liquid phase is treated simultaneously with water and free oxygen until, by reaction therewith, a freely water-soluble hydroxylated terpene product is formed.

Under ordinary atmospheric conditions, an extremely long period of time is required to bring about the desired reaction in substantial yields. However, it has further been found that the reaction time is reduced, and yields are increased by reaction of the liquid unsaturated terpene hydrocarbon with water and with free oxygen under superatmospheric pressure. It has also been found that reaction time can be shortened and yields increased by employment in the reaction mixture of oxygen-carrying materials as catalysts for the reaction.

The reaction in accordance with this invention in a more general sense produces polyhydric terpene products from materials having fewer or no hydroxyl groups. These products are in part freely water-soluble and in part insoluble or only very slightly soluble in water. After the reaction has been conducted for the desired period to form the polyhydric terpene products, these products may be recovered from the reaction mixture.

The method in accordance with this invention utilizes as the chief reactant any unsaturated monocyclic terpene hydrocarbon. Terpene hydrocarbons such as dipentene, terpinene, phellandrene, sylvestrene, alpha-pyronene, beta-pyronene, and the like are suitable. Mixtures of such hydrocarbons or commercial cuts rich therein may be utilized. Such hydrocarbons may be obtained by fractionation of pine wood extracts, as by-products in various terpene compound syntheses, or by isomerization of alpha-pinene, beta-pinene or turpentine by means of acids, heat, etc.

The hydrocarbon terpinolene, by which is meant the terpene hydrocarbon or hydrocarbon cut obtainable from pine trees, boiling between 180° C. and 195° C. at 760 mm. pressure (in relatively pure form between 187° C. and 191° C.), and having a specific gravity between 0.863 and 0.873 (in relatively pure form between 0.865 and 0.870) at $$\frac{15.6° \text{ C.}}{15.6° \text{ C.}}$$

differs greatly from other terpenes in its activity in the method in accordance with this invention in that it reacts much more rapidly; it provides yields of water-soluble products many times as large as those from other terpene hydrocarbons.

The reaction in accordance with this invention is brought about by admixing the terpene hydrocarbon with water in the presence of free oxygen. Vigorous agitation is utilized to insure establishment of continually renewed contact surfaces between the free oxygen and the terpene and the water. Preferably, an oxygen-containing gas such as air is whipped up into, or bubbled through, a mixture of the terpene hydrocarbon and water to furnish the free oxygen.

The reaction is in general continued for long periods of time. The time required depends somewhat upon the reactants utilized and upon the conditions of the reaction, as well as upon the yield desired. In general, under ordinary atmospheric conditions, the treatment will be continued for at least a day, and may be continued for as much as, say, 40 days, five to fifteen days' treatment being usual. In any case, the reaction will be continued until a polyhydroxy, preferably freely water-soluble, terpene product is obtained from the terpene being reacted upon.

The reaction may be carried out at ordinary atmospheric temperatures. Temperatures in the range between about 0° C. and about 200° C. with temperatures preferably between about 30° C. and about 80° C. are utilized. Temperatures below about 100° C. are necessary where a maximum of products high in tertiary hydroxyl content and in water-solubility is desired.

The yield of water-soluble product obtained is relatively low. For example, when the reaction is conducted with dipentene for about ten days utilizing air at atmospheric pressure as a source of free oxygen, yields of less than 10% by weight of the terpene being reacted upon are usually obtained. In general, yields are from 3–25% except in the case of terpinolene which gives yields of 10–60%. Unreacted terpenes do not represent a loss, since they may be utilized for other purposes or re-used. However, to decrease the time required for reaction to a given yield and to improve the yield, the free oxygen may be provided in relatively pure form or in the form of an oxygen-containing gas such as air under superatmospheric pressure. Any convenient pressure may be utilized, pressures up to and in excess of 5,000 atmospheres being suitable. However, pressures between about 10 and about 100 atmospheres of air or oxygen are usually applied to the reacting mixture. When utilizing free oxygen under superatmospheric pressure, the reaction time may be as low as one hour for very high pressure, a reaction time between about 5 and about 24 hours being preferred.

Yields may be improved and reaction time shortened somewhat by including in the reaction mixture a material which is a carrier of oxygen. This material serves as a catalyst for the reaction. Oxygen-carrying materials fall into several groups. For example, compounds of elements which have the characteristic of readily changing valence are suitable where such compounds are at least partially soluble in either water or the terpene hydrocarbon utilized. For example, compounds of lead, cobalt, manganese, cerium, vanadium, chromium, sulfur, selenium, such as lead naphthanate, lead linoleate, lead abietate, cobalt naphthanate, cobalt linoleate, cobalt abietate, manganese naphthanate, manganese linoleate, manganese ricinoleate, potassium permanganate, manganese sulfate, potassium dichromate, chromium sulfate, vanadium sulfate, cerium sulfate, vanadium chloride, hydrogen sulfide, ethyl mercaptan, ethyl disulfide, selenium oxide, and so forth, are suitable and may be used as catalysts. Another group of oxygen-carrying materials is composed of solids with active surfaces; i. e., "absorbents" such as activated carbon, activated alumina, activated silica, activated clay, flaked aluminum metal, and the like. Another important group of oxygen carriers finding use in the method according to this invention is composed of hydrohalides of nitrogen compounds of a basic character; i. e., such compounds as ammonium chloride, ammonium bromide, ammonium iodide, pyridine hydrochloride, trimethyl benzyl ammonium chloride, aniline hydrochloride, methylamine hydrochloride, toluidene hydrochloride, and the like.

Oxygen-carrying materials will in general be incorporated as catalysts in a quantity between about 0.1 and about 25% by weight of the terpene being reacted upon, although in most cases a quantity between about 0.5% and about 10% is preferred. However, the quantity utilized will be less than a quantity having substantial oxidizing action upon the terpene present by itself. Thus, where the oxygen carrier utilized happens to be a strongly oxidizing agent, such as in the case of potassium permanganate, the quantity utilized will be less than sufficient to have any appreciable oxidizing effect per se upon the terpene. Strong oxidation agents tend to form scission products or of ketone and acid products instead of the hydroxylated, freely water-soluble products desired. Hence, any material utilized as catalyst is used only in an oxygen-carrying quantity to transfer oxygen from the air slowly to the terpene being reacted upon, but not in such quantity to cause severe oxidation of the terpene or the water-soluble product.

The relative proportion of unsaturated terpene and water utilized in the method according to this invention may be varied widely, but in general the quantity of water will be somewhat in excess of that required for reaction with the terpene being treated. In general, it will be convenient to utilize water in a quantity between about 0.2 times and about 20 times the weight of the terpene reacted upon. Desirably sufficient water will be utilized to insure solution of the greater part of the water-soluble product in the aqueous phase at the end of the reaction and to maintain the viscosity of the reactants at a minimum for good contact. Where insufficient water is present at the end of the reaction, more may be added to strip water-soluble products from the oily phase. Diluents such as acetone, methyl ethyl ketone, ethyl acetate, methyl acetate, etc., may be present.

At the end of the reaction period, the reaction mixture is permitted to form two layers, one of which is aqueous, and the other of which consists of unreacted terpenes and water-insoluble reaction products. The two layers are then separated, and if desired, the reaction products are isolated therefrom. The water-soluble products may be recovered by evaporation of the water therefrom at a reduced pressure. Desirably, the evaporation is conducted under high vacuum at a temperature in the range between about 40° C. and about 90° C.

The water-soluble evaporation residue from the treatment of monocyclic terpenes is a pale yellow-colored, or colorless, viscous liquid which is freely water-soluble; i. e., miscible in all proportions, and which crystallizes at least partially upon standing. The crystalline product may be separated by filtration or centrifuging the partially crystallized product. It is believed the water-soluble reaction product consists of polyhydric terpene alcohols having for the most part the empirical formula $C_{10}H_{17}(OH)_3$ in admixture with a portion of mono-formate esters of such alcohols. Analyses indicate the presence of some dihydric terpene alcohols.

The crystalline product from terpinolene has the following properties:

| | |
|---|---|
| Color | White |
| Melting point | 120–122° C. |
| Ultimate analysis: | |
| C | 64.34 |
| H | 9.64 |
| O | 24.06 |
| Tertiary hydroxyl content | 24.6% |
| Molecular weight (Rast method) | 206 |

These data indicate that the crystalline product is a trihydric alcohol having the empirical formula $C_{10}H_{17}(OH)_3$.

The oily layer resulting from the reaction contains water-insoluble reaction products as well as unreacted terpene. Usually, this layer will first be given an extractive wash with pure water to strip it of any water-soluble material dissolved therein which may be added to the water layer, after which water-insoluble reaction products may be recovered. Recovery is readily accomplished by steam distillation of the oily layer, preferably at reduced pressure. The steam distillation removes most of the unreacted terpene, and leaves a distillation residue having an appreciable tertiary and secondary water-insoluble terpene alcohol content. The alcohols are largely dihydroxy and monohydroxy and are diluted with terpene hydrocarbons.

The nature of the water-soluble and water-insoluble hydroxylated terpene products obtained by the method in accordance with this invention will be apparent from the following table. The ranges of properties given therein represent typical analyses. It will be appreciated that considerable variation is possible according to the conditions of reaction utilized. For example, where high temperatures are utilized, the quantity of tertiary hydroxyl drops appreciably to some extent in favor of secondary hydroxyl content. In general, high temperatures cause formation of a greater proportion of water-insoluble products with a smaller yield of water-soluble products, since high temperatures tend to dehydrate the water-soluble products to water-insoluble products.

| Property | Water-insoluble products | Water-soluble products |
|---|---|---|
| Tertiary alcohol content | 1-65% | 10-200%. |
| Secondary alcohol content | 0.5-25% | 1-15%. |
| Specific gravity | 0.86-0.93 | |
| Wetting-cut value | 10-20 g./liter | 30-40 g./liter. |
| Boiling point | 170-300° C | Decomposes. |
| State | Liquid | Solid and liquid. |
| $n_D$ | 1.47-1.49 | |

The products are substantially free of aldehydes and ketones. No appreciable scission or cracking occurs although isomerization is believed to occur. The reaction is essentially additive in nature with considerable increase in the atomic weights of the terpenes reacted.

The process and product in accordance with this invention are illustrated in specific embodiments by the examples which follow. Unless otherwise specified, all parts and percentages are by weight.

*Example I*

A mixture of 1500 milliliters of dipentene and 1500 millimeters of water was vigorously agitated while a slow stream of air was bubbled therethrough for a period of 180 hours at a temperature ranging between 28 and 37° C. The resulting reaction product was permitted to separate into an aqueous layer and an oily layer, and the layers forming were separated by decantation. The aqueous layer so obtained had a volume of 1540 milliliters, whereas the oily layer had a volume of 1340 milliliters. The aqueous solution was carefully evaporated under reduced pressure at a temperature of 50° C. to obtain 113 grams of water-soluble hydroxylated terpene product. This material crystallized partially upon standing four months. The crystals melted at 120° C.

*Example II*

Two thousand millimeters of a terpinolene cut of high purity and 1000 millimeters of water were agitated at a temperature of 26° C. to 35° C. for a period of 297 hours. During this entire time, a small stream of air was passed through the reaction mixture. The final product was poured into a separatory funnel and allowed to separate whereby 1050 milliliters of oily material and 2750 milliliters of a water phase were obtained.

The water layer was carefully evaporated on a steam bath at reduced pressure (2 cm. Hg) whereby 928 grams of a pale-colored, water-soluble, viscous, liquid product was obtained, believed to be essentially a mixture of water-soluble, trihydric alcohols. Upon standing for three months, a water-soluble solid alcohol slowly crystallized out and was finally recovered by filtration. This crystalline, water-soluble alcohol had a melting point of 120–122° C.

*Example III*

Three thousand grams of a terpene fraction composed approximately of two-thirds terpinolene and one-third of terpinene, dipentene, water-insoluble terpene alcohols, etc., were agitated for a period of six days at room temperature with 600 grams of water in the presence of air. During this time the relative volume of the oil phase progressively decreased, with a corresponding increase in the volume of the water phase. At the end of the reaction period only a small amount of oil phase remained. This phase consisted largely of terpinene, dipentene, water-insoluble terpene alcohols and some water-soluble terpene alcohols, while the aqueous phase comprised water, water-soluble terpene alcohols, and some water-insoluble terpene alcohols produced by hydration and held in solution by the high proportion of water-soluble terpene alcohol present. The two phases were then separated and the water phase diluted with an equal volume of water. This dilution threw the water-insoluble components out of the solution, leaving the water-soluble alcohols in solution. The water was then evaporated from this aqueous solution under vacuum. The last trace of water was then removed by blowing with carbon dioxide. On cooling, the alcohol became semi-solid and then crystallized on standing. The crystalline material was then filtered from the mother liquor and washed with benzol to yield a white crystalline product. This product melted at approximately 120° C. (capillary method) and was freely soluble in water.

*Example IV*

A sample of purified terpinolene, made by the careful laboratory fractionation of a terpinolene "cut" obtained in the purification of crude wood turpentine, had the following composition:

Specific gravity _____ 0.8706
Boiling point _____°C__ 187–189

Two hundred and eighty milliiters of this terpinolene were stirred with 52 milliliters of water for 24 hours at room temperature, in the presence of air. At the end of this time 25 milliliters additional water were added and the stirring continued. Again at the end of the second 24 hours, 25 milliliters more of water were added and the agitation continued to a total of 96 hours. At the end of this time the oil layer of the reaction mixture had a volume of 129 milliliters and the aqueous layer a volume of 226 milliliters. The aqueous layer contained the water-soluble alcohol derived from terpinolene. The aqueous layer was then separated without precipitating out dissolved oils. The water layer was freed from water by vacuum distillation, and dried by blowing with carbon dioxide. On cooling, the alcohol became semi-solid (partially crystallized). The semi-solid material yielded 24.9% of water by tertiary alcohol breakdown, and 1.33% of water by secondary alcohol breakdown. Washed crystals melted at 119–120° C.

The oil layer which remained at the end of the reaction gave the following analysis:

| | |
|---|---|
| Specific gravity $\left(\frac{15.6° C.}{15.6° C.}\right)$ | 0.9290 |
| Refractive index | 1.4949 |
| Moisture___per cent__ | 0.40 |
| Tertiary alcohol___do___ | 36.2 |
| Secondary alcohol___do___ | 14.5 |
| Boiling range: | |
| 1st drop___° C__ | 189 |
| 17%___° C__ | 193 |
| 33%___° C__ | 194 |
| 50%___° C__ | 198 |
| 67%___° C__ | 204 |
| 83%___° C__ | 225 |
| 90%___° C__ | 228 |

This analysis showed that the oil layer was comprised largely of secondary and tertiary terpene alcohols derived from terpinolene, which were not water-miscible.

*Example V*

A mixture of 500 milliliters of terpinolene and 500 milliliters of water, the latter recovered from a preceding hydration reaction involving terpinolene, were placed in an autoclave and vigorously shaken at a temperature of 65° C. for 5½ hours under a pressure of 1300 pounds per square inch gauge of air in the autoclave. At the end of this period the reaction product was removed from the autoclave and permitted to separate into an aqueous layer and an oily layer. The two layers were separated by decantation. The aqueous layer was evaporated at a reduced pressure at a temperature of 40–80° C. Upon evaporation of the water, there was recovered an evaporation residue of 252 grams of water-soluble hydroxylated terpene product derived from the terpinolene. This product largely crystallized upon standing for three weeks. The crystals were washed with benzene and dried; they were white and had a melting point of 120–122° C.

*Example VI*

A mixture consisting of 1500 milliliters of water, 1500 milliliters of terpinolene, and 5 grams of ammonium chloride was agitated for 90 hours at a temperature of 38° C. while a slow stream of air was bubbled therethrough. The reaction product mixture was then permitted to separate into an aqueous and an oily layer which were separated by decantation. The aqueous layer was evaporated in vacuo at a temperature of 50–80° C. to obtain a yield of 565 grams of viscous, water-soluble liquid. Upon standing, this liquid partially crystallized to form water-soluble white crystals of polyhydric terpene alcohol.

*Example VII*

A mixture consisting of 10,000 milliliters of terpinolene, 10,000 milliliters of water, and 50 grams of Darco activated carbon was agitated for 63 hours at a temperature of 40° C. while a slow stream of air was bubbled through the mixture. At the end of this period, the reaction mixture was permitted to separate into two layers which were separated by decantation. Recovery of the water-soluble products of the aqueous layer was accomplished by filtration and then evaporation at reduced pressure at a temperature of 50–80° C. Four thousand three hundred forty-two grams of water-soluble terpene polyhydric alcohol were recovered. The powder crystallized on standing to give snow-white crystals melting at 121° C.

*Example VIII*

A mixture consisting of 1500 milliliters of terpinolene, 1500 milliliters of water, and 1 gram of potassium permanganate was agitated 144 hours at a temperature of 35° C. while bubbling a slow stream of air therethrough. Recovery of water-soluble products as in the manner of the previous example gave a yield of 772 grams.

*Example IX*

A mixture consisting of 1500 milliliters of a terpinolene cut, 1500 milliliters of water, and 2 grams of cobalt naphthanate was agitated for 144 hours at a temperature of 35° C. while bubbling air therethrough. Recovery of water-soluble product was accomplished as in Example VI.

*Example X*

A mixture consisting of 1500 milliliters of terpinolene, 1500 milliliters of water, and 7.5 grams of flake aluminum metal was agitated for 99 hours at a temperature of 35° C. while bubbling air therethrough. Recovery of water-soluble material in the manner of Example VII gave a yield of 476 grams.

*Example XI*

A mixture consisting of 1500 milliliters of terpinolene, 1500 milliliters of water, and 32 grams of amyl lead mercaptide was agitated for 90 hours at a temperature of 35° C. Recovery of water-soluble material in the manner of the previous example gave a yield of 510 grams.

*Example XII*

A mixture consisting of 500 grams of dipentene, 500 grams of water, and 5 grams of Darco activated carbon was placed in an autoclave and the autoclave charged to a pressure of 1400 pounds per square inch. The contents of the autoclave were then vigorously shaken for 5½ hours at a temperature of 50° C. At the end of this period, the contents were removed from the autoclave and permitted to separate into two layers. The water layer was removed by decantation and evaporated under vacuum to yield the water-soluble product.

*Example XIII*

A mixture consisting of 500 milliliters of terpinolene, 500 milliliters of water, and 5 grams of ammonium chloride was placed in an autoclave and the autoclave charged with air to a pressure of 1400 pounds per square inch. The autoclave was then vigorously shaken for 5½ hours at a temperature of 50° C. At the end of this period, the contents were removed from the autoclave, permitted to form two layers, and separated by decantation. Evaporation of the aqueous layer so obtained gave a yield of 203 grams of water-soluble product. A water-insoluble terpene alcohol mixture was obtained as the residue after steam-distilling the oily layer to remove unreacted terpene hydrocarbon.

*Example XIV*

A mixture consisting of 1500 milliliters of mixed alpha- and beta-pyronenes, 1500 milliliters of water and 15 grams of ammonium chloride was placed in an autoclave and the autoclave charged with substantially pure oxygen at a pressure of 500 lbs. per square inch. The autoclave was then vigorously shaken for 7½ hours at a temperature of 50–55° C. At the end of this period, the contents were removed from the autoclave, permitted to form 2 layers and separated by decantation. Evaporation of the water from the aqueous layer at reduced pressure, and a temperature of 60–75° C. yielded a syrupy water-soluble polyhydroxy terpene product which crystallized upon standing for 2 months. The crystals washed with benzene had a melting point of 119° C. The oily layer formed by the reaction was steam distilled to remove unreacted terpene hydrocarbons and yielded a fraction rich in water-insoluble terpene alcohols.

Tertiary alcohol content as used herein is determined by dehydration under the influence of sodium acid sulphate as a catalyst, measuring the water and any alcohol evolved as indicative of tertiary hydroxyl. Secondary alcohol content is determined by acetylation of the dehydrated residue from the tertiary alcohol determination, followed by saponification, then determining the saponification number in the usual manner and calculating the secondary alcohol content therefrom. Results expressed as alcohol content are calculated on the monohydric alcohol basis assuming the formula $C_{10}H_{17}OH$.

The products obtained by the method in accordance with this invention are useful in the concentration of minerals by froth flotation. They are also useful as solvents, especially where it is desirous to couple water-soluble and water-insoluble substances which would otherwise be immiscible.

It will be understood that the details and examples hereinbefore set forth are illustrative only and that the invention as broadly described and claimed is in no way limited thereby.

This application is a division of my application for United States Letters Patent, Serial No. 394,860, filed May 23, 1941, which application in turn is a continuation-in-part of my application for United States Letters Patent, Serial No. 328,933, filed April 10, 1940.

What I claim and desire to protect by Letters Patent is:

1. A method of preparing a polyhydroxy terpene product, containing at least three hydroxyl groups, which comprises reacting an unsaturated monocyclic terpene hydrocarbon in liquid phase with water and with free oxygen, as substantially the sole sources of oxygen in the product, at a temperature of about 30° C. to about 80° C. for a period of time from about 5 hours to about 40 days.

2. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen, as substantially the sole sources of oxygen in the product, at a temperature of about 30° C. to about 80° C. for a period of time from about 5 hours to about 40 days.

3. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen under superatmospheric pressure, as substantially the sole sources of oxygen in the product, at a temperature of about 30° C. to about 80° C. for a period of time of from about 5 hours to about 24 hours.

4. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen under a pressure between about 1 and about 1000 atmospheres, the water and free oxygen being substantially the sole sources of oxygen in the product, at a temperature of about 30° C. to about 80° C. for a period of time of from about 5 hours to about 24 hours.

5. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen, the water and free oxygen being substantially the sole sources of oxygen in the product, and with a small amount of an oxygen-carrying material as a catalyst, the said catalyst material being utilized in a quantity less than a quantity having substantial oxidizing action on the terpene by itself, the reaction being carried out at a temperature of about 30° C. to about 80° C. for a period of time of from about 5 hours to about 40 days.

6. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen under superatmospheric pressure, the water and free oxygen being substantially the sole sources of oxygen in the product, and with a small amount of an oxygen-carrying material as a catalyst, the said catalyst material being utilized in a quantity less than a quantity having substantial oxidizing action on the terpene by itself, the reaction being carried out at a temperature of about 30° C. to about 80° C. for a period of time of from about 5 hours to about 24 hours.

7. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen, the water and free oxygen being substantially the sole sources of oxygen in the product, and with a small amount of a compound containing an element which readily changes valence as a catalyst, the said catalyst material being utilized in a quantity less than a quantity having substantial oxidizing action on the terpene by itself, the reaction being carried out at a temperature of about 30° C. to about 80° C. for a period of time of from about 5 hours to about 40 days.

8. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen, the water and free oxygen being substantially the sole sources of oxygen in the product, and with a hydrohalide of a basic nitrogen compound as a catalyst, the reaction being carried out at a temperature of about 30° C. to about 80° C. for a period of time of from about 5 hours to about 40 days.

9. A method of preparing a polyhydroxy terpene product, containing at least three hydroxyl groups, which comprises reacting an unsaturated monocyclic terpene hydrocarbon in liquid phase with water in excess of the amount reactive with the terpene, and with free oxygen, the water and free oxygen being substantially the sole sources of oxygen in the product, and with activated charcoal as a catalyst, the reaction being carried out at a temperature of about 30° C. to about 80° C. for a period of time of from about 5 hours to about 40 days.

10. A method of preparing a polyhydroxy terpene product, containing at least three hydroxyl groups, which comprises reacting dipentene in liquid phase with water and with free oxygen, as substantially the sole sources of oxygen in the product, at a temperature of about 30° C. to about 80° C. for a period of time of from about 5 hours to about 40 days.

11. A method of preparing a polyhydroxy terpene product, containing at least three hydroxyl groups, which comprises reacting a terpene selected from the group consisting of alpha-pyronene, beta-pyronene, and mixtures thereof in liquid phase with water and with free oxygen, as substantially the sole sources of oxygen in the product, at a temperature of from about 30° C. to about 80° C. for a period of time of from about 5 hours to about 40 days.

DONALD A. LISTER.